United States Patent
Pulisciano et al.

(10) Patent No.: US 12,223,640 B2
(45) Date of Patent: Feb. 11, 2025

(54) TURBINE BLADE CREEP MONITORING

(71) Applicant: ROLLS-ROYCE plc, London (GB)

(72) Inventors: Adriano Pulisciano, Birmingham (GB); Bilal M Nasser, Derby (GB)

(73) Assignee: ROLLS-ROYCE PLC, London (GB)

(*) Notice: Subject to any disclaimer, the term of this patent is extended or adjusted under 35 U.S.C. 154(b) by 438 days.

(21) Appl. No.: 17/712,676

(22) Filed: Apr. 4, 2022

(65) Prior Publication Data

US 2022/0351352 A1 Nov. 3, 2022

(30) Foreign Application Priority Data

Apr. 29, 2021 (GB) ...................................... 2106109

(51) Int. Cl.
| | |
|---|---|
| *G06T 7/00* | (2017.01) |
| *F01D 5/14* | (2006.01) |
| *F01D 25/00* | (2006.01) |
| *G06T 7/593* | (2017.01) |
| *G06T 7/80* | (2017.01) |

(52) U.S. Cl.
CPC ................ *G06T 7/001* (2013.01); *F01D 5/14* (2013.01); *F01D 25/00* (2013.01); *G06T 7/593* (2017.01); *G06T 7/85* (2017.01); *F05D 2220/323* (2013.01); *F05D 2240/30* (2013.01);
(Continued)

(58) Field of Classification Search
CPC ...... F01D 21/003; F01D 25/00; F01D 25/285; F01D 5/005; F01D 5/14; F05D 2220/323; F05D 2230/80; F05D 2240/30; F05D 2260/80; F05D 2260/83; F05D 2270/30; G01B 11/16; G01B 11/24; G01N 21/954;
(Continued)

(56) References Cited

U.S. PATENT DOCUMENTS

| | | |
|---|---|---|
| 7,810,385 B1 | 10/2010 | Narcus |
| 9,618,334 B2 | 4/2017 | Burnside et al. |

(Continued)

FOREIGN PATENT DOCUMENTS

| | | |
|---|---|---|
| DE | 10 2019 100 821 A1 | 7/2020 |
| EP | 3168585 A1 | 5/2017 |

(Continued)

OTHER PUBLICATIONS

U.S. Appl. No. 17/712,631, filed Apr. 4, 2022 in the name of Pulisciano et al.
(Continued)

*Primary Examiner* — Ruiping Li
(74) *Attorney, Agent, or Firm* — Oliff PLC

(57) ABSTRACT

A method of monitoring turbine blade creep in a gas turbine engine is provided. The method includes: receiving stereo images of a turbine blade of a row of turbine blades, the images having been obtained using a stereo borescope located in the engine adjacent the row of turbine blades; identifying same features of the blade in each of the stereo images; mapping each of the identified features by triangulation onto a 3D space to produce a 3D depth map of at least part of the blade; providing a 3D reference model of the blade; and comparing the 3D reference model with the 3D depth map to measure one or more deviations in shape of the blade to determine an amount of creep-induced distortion of the blade.

15 Claims, 6 Drawing Sheets

(52) U.S. Cl.
CPC ...... *F05D 2260/80* (2013.01); *F05D 2260/83* (2013.01); *G06T 2207/10021* (2013.01)

(58) Field of Classification Search
CPC .......... G02B 23/24; G06T 2207/10021; G06T 7/001; G06T 7/593; G06T 7/85
See application file for complete search history.

(56) References Cited

U.S. PATENT DOCUMENTS

| | | |
|---|---|---|
| 9,879,981 B1 | 1/2018 | Dehghan Niri et al. |
| 2009/0225333 A1 | 9/2009 | Bendall et al. |
| 2010/0266410 A1 | 10/2010 | Amaral et al. |
| 2013/0093879 A1 | 4/2013 | Bertolotti |
| 2013/0202192 A1 | 8/2013 | Telfer et al. |
| 2014/0096601 A1 | 4/2014 | Barthelemy et al. |
| 2015/0168263 A1 * | 6/2015 | Mueller ................ F01D 21/003 348/82 |
| 2015/0241308 A1 | 8/2015 | Pandey et al. |
| 2016/0305769 A1 | 10/2016 | Burnside et al. |
| 2017/0138820 A1 | 5/2017 | Nickles et al. |
| 2017/0176291 A1 | 6/2017 | Bojappa et al. |
| 2017/0358073 A1 | 12/2017 | Yuksel |
| 2018/0094537 A1 | 4/2018 | Pulisciano et al. |
| 2018/0270465 A1 | 9/2018 | Bendall |
| 2018/0292275 A1 | 10/2018 | Byers et al. |

FOREIGN PATENT DOCUMENTS

| | | | |
|---|---|---|---|
| EP | 3173732 A1 | 5/2017 | |
| EP | 3182059 A1 | 6/2017 | |
| EP | 3182085 A1 | 6/2017 | |
| EP | 3330692 A1 * | 6/2018 | ............ G01B 11/16 |
| EP | 3351896 A1 | 7/2018 | |
| JP | H08-313221 A | 11/1996 | |
| JP | 2015-078895 A | 4/2015 | |
| JP | 2016-510450 A | 4/2016 | |
| JP | 2017-122715 A | 7/2017 | |
| WO | 93/00766 A1 | 1/1993 | |
| WO | 2020148084 A1 | 7/2020 | |

OTHER PUBLICATIONS

Oct. 27, 2021 Combined Search and Examination Report issued in Great Britain Patent Application No. 2106109.8.
Oct. 19, 2021 Combined Search and Examination Report issued in Great Britain Patent Application No. 2106108.0.
Hartley, Richard et al. "Multiple View Geometry". CVPR, 1999, <Online https://users.cecs.anu.edu.au/~hartley/Papers/CVPR99-tutorial/tutorial.pdf>.
Zhang, Zhengyou. "A Flexible New Technique for Camera Calibration". Technical Report MSR-TR-98-71, pp. 1-21, 1998.
Feb. 7, 2024 Office Action issued in U.S. Appl. No. 17/712,631.
Jul. 5, 2022, Extended European Search Report issued in Patent Application No. 22165907.1.
Apr. 10, 2023 Office Action Issued U.S. Appl. No. 17/712,631.
Jun. 15, 2023 Office Action Issued in U.S. Appl. No. 17/712,631.
Oct. 10, 2022 Extended Search Report issued in European Patent Application No. 22165908.9.
Oct. 20, 2023 Office Action issued in U.S. Appl. No. 17/712,631.

* cited by examiner

TURBINE BLADE CREEP MONITORING

CROSS-REFERENCE TO RELATED APPLICATIONS

This specification is based upon and claims the benefit of priority from UK Patent Application Number 2106109.8 filed on 29 Apr. 2021, the entire contents of which are incorporated herein by reference.

TECHNICAL FIELD

The present disclosure relates to a method and a system for monitoring turbine blade creep in a gas turbine engine.

BACKGROUND

Conventionally borescopes are used to view internal components within an assembled gas turbine engine to determine if the components within the engine are damaged and need repair or if they are undamaged and do not require repair. The use of borescopes enables the components to be viewed without having to disassemble the gas turbine engine into modules or sub modules.

The current approach for on-wing assessment of turbine blade creep is to use a borescope to visually estimate the radial growth of a blade with a borescope by observing the size of the gap between a shroud of the blade and a liner forming the outer wall of the working annulus of the engine. This provides a qualitative measure of creep in the blade, but it is non-quantifiable, and results vary between operators. Metrical (i.e. quantitative) measurement is currently performed by stripping down the engine and precisely measuring the dimensions of the top of the blade using a coordinate measurement machine (CMM). This is time-consuming and expensive, and can only be performed when the engine is in a maintenance facility with the necessary equipment.

Accordingly, current approaches to creep measurement lack consistency, are inefficient, and do not generally provide enough quantitative data to understand creep growth in different cycling stages and on different parts of the blade. As a result, turbine blades may be replaced unnecessarily early in their life cycle, adding substantially to engine running costs.

BRIEF SUMMARY

According to a first aspect there is provided a method of monitoring turbine blade creep in a gas turbine engine, the method including:
  receiving stereo images of a turbine blade of a row of turbine blades, the images having been obtained using a stereo borescope located in the engine adjacent the row of turbine blades;
  identifying same features of the blade in each of the stereo images;
  mapping each of the identified features by triangulation onto a 3D space;
  measuring in the 3D space a distance (D) between radially inner and radially outer landmarks (36, 38) on the blade, the positions of the landmarks being determined by reference to the mapped positions of the identified features; and
  comparing the measured distance with a reference distance to determine an amount of creep-induced distortion of the blade.

Advantageously, by using stereo images and triangulation therefrom in this way, it is possible to obtain distance measurements which are sufficiently accurate and reproducible to monitor turbine blade creep, and which do not require the determination of individual image distance conversion scales for converting from pixels to physical distance. Moreover, the method can be performed on-wing and without stripping down the engine. Thus, it facilitates relatively frequent measurements from which creep growth in different cycling stages and on different parts of the blade can be understood. Turbine blades are currently used for a conservative number of operation cycles. More accurate determination of turbine blade creep allows for the turbine blades to be used for a longer duration, reducing operating costs.

Optional features of the method of the first aspect will now be set out. These are applicable singly or in any combination.

The landmarks may be respectively on a platform and a shroud of the turbine blade. A measured distance between such landmarks is highly sensitive to creep-induced lengthening of the blade. For example, each landmark may conveniently be a corner of the respective platform or shroud closest the trailing edge of the blade.

The reference distance may be the distance between the radially inner and radially outer landmarks for a turbine blade which has not experienced creep. For example, this reference distance may be determined by measuring an actual blade or by extracting the distance information from a 3D model (e.g. a CAD model or a scan data model) of the blade.

The receiving, identifying, mapping, measuring and comparing, may be performed for each of successive turbine blades of the row of turbine blades. In particular the method of the first aspect can be used to monitor all the turbine blades of the row for creep.

According to a second aspect there is provided a method of monitoring turbine blade creep in a gas turbine engine, the method including:
  receiving stereo images of a turbine blade of a row of turbine blades, the images having been obtained using a stereo borescope located in the engine adjacent a row of turbine blades;
  identifying same features of the blade in each of the stereo images;
  mapping each of the identified features by triangulation onto a 3D space to produce a 3D depth map of at least part of the blade;
  providing a 3D reference model of the blade; and
  comparing the 3D reference model with the 3D depth map to measure one or more deviations in shape of the blade to determine an amount of creep-induced distortion of the blade.

Thus, the method of the second aspect expands upon that of the first aspect by producing a 3D depth map of at least part the blade rather than just measuring in the 3D space a distance between landmarks. This enables a more general comparison with a 3D reference model, such that several different and/or more complex deviations in shape of the blade can be measured. All of the aspects defined herein map identified features into 3D space, they therefore do not require precise positioning of the stereo borescope.

Optional features of the method of the second aspect will now be set out. These are applicable singly or in any combination.

The 3D depth map may include a platform and a shroud of the blade. The creep-induced distortion may then include creep-induced twisting and/or creep-induced elongation of the blade between the platform and the shroud.

The 3D depth map may be a substantially complete map of the blade, or just a partial map of relevant portions (e.g. platform and shroud) of the blade.

The received stereo images may include a seal segment located radially outwardly of the blades, in use the blades moving past the seal segment as the row of turbine blades rotates. In this case, the method may further include also identifying the seal segment in each of the stereo images; the 3D depth map may include a shroud of the blade; the method may further include also mapping the seal segment by triangulation onto the 3D space such that the produced 3D depth map also includes the seal segment; the provided 3D reference model may be a model of the blade and the seal segment; and the creep-induced distortion may be determined by measuring relative twisting between the shroud and the seal segment. Thus, rather than measuring creep-induced twisting between parts of blade, the measuring can be between a part of the blade and another part of the engine.

The receiving, identifying, mapping and comparing of the method of the second aspect may be performed for each of successive turbine blades of the row of turbine blades. In particular the method of the second aspect can be used to monitor all the turbine blades of the row for creep.

Optional features of the method of the first or second aspect will now be set out. These are applicable singly or in any combination.

The method may further include: calibrating the stereo borescope to determine imaging distortions produced thereby; and using the calibration to adjust the images to remove or reduce imaging distortions before the mapping onto the 3D space.

The stereo borescope may be used to obtain a stereo video of the turbine blade as the row of turbine blades rotates, the stereo images being stills extracted from the stereo video.

The identifying may include performing automated image analysis to extract feature lines of each of the stereo images. For example, the extracted lines can be the trailing edge line, one or more platform edge lines, one or more shroud edge lines from each of the images and/or one or more seal segment edge lines. This can help to remove a source of operator variation. The image analysis may perform image filtering as a precursor to extracting the edge lines of the blade.

The method may further include, preliminary to receiving the image of a turbine blade: locating the stereo borescope in the engine adjacent the row of turbine blades; and using the stereo borescope to obtain the stereo images of the turbine blade of the row of turbine blades.

Locating the borescope in the engine may comprise inserting the borescope into a port on an accessible part of the engine. Guiding the borescope through a guide tunnel until the end of the borescope is at the end of the guide tunnel.

In embodiments, a method of the first aspect may additionally perform a comparison of the 3D reference model with the 3D depth map of the second aspect and any optional features associated therewith. Similarly, a method of the second aspect may comprise the step of measuring in 3D space, the distance D of the first aspect and any optional features associated therewith.

According to a third aspect there is provided a system for monitoring turbine blade creep in a gas turbine engine, the system including: a computer readable medium for storing stereo images of a turbine blade of a row of turbine blades, the images having been obtained using a stereo borescope located in the engine adjacent the row of turbine blades; and
a processor-based sub-system operationally connected to the computer readable medium and adapted to:
identify same features of the blade in each of the stereo images;
map each of the identified features by triangulation onto a 3D space;
measure in the 3D space a distance (D) between radially inner and radially outer landmarks (36, 38) on the blade, the positions of the landmarks being determined by reference to the mapped positions of the identified features; and
compare the measured distance with a reference distance to determine an amount of creep-induced distortion of the blade.

Thus, the system of the third aspect corresponds to the method of the first aspect.

Optional features of the method of the first aspect pertain also to the system of the third aspect.

Thus, the landmarks may be respectively on a platform and a shroud of the turbine blade. For example, each landmark may be a corner of the respective platform or shroud closest the trailing edge of the blade.

The reference distance may be the nominal distance between the radially inner and radially outer landmarks for a turbine blade which has not experienced creep.

According to a fourth aspect there is provided a system for monitoring turbine blade creep in a gas turbine engine, the system including:
a computer readable medium for storing stereo images of a turbine blade of a row of turbine blades, the images having been obtained using a stereo borescope located in the engine adjacent the row of turbine blades; and
a processor-based sub-system operationally connected to the computer readable medium and adapted to:
identify same features of the blade in each of the stereo images;
map each of the identified features by triangulation onto a 3D space to produce a 3D depth map of at least part of the blade;
provide a 3D reference model of the blade; and
compare the 3D reference model with the 3D depth map to measure one or more deviations in shape of the blade to determine an amount of creep-induced distortion of the blade.

Thus, the system of the fourth aspect corresponds to the method of the second aspect.

Optional features of the method of the second aspect pertain also to the system of the fourth aspect.

The 3D depth map may include a platform and a shroud of the blade. The creep-induced distortion may then include creep-induced twisting and/or creep-induced elongation of the blade between the platform and the shroud.

The 3D depth map may be a substantially complete map of the blade, or just a partial map of relevant portions (e.g. platform and shroud) of the blade.

The stereo images may include a seal segment located radially outwardly of the blades, in use the blades moving past the seal segment as the row of turbine blades rotates. In this case: the processor-based sub-system may be further adapted to also identify the seal segment in each of the stereo images; the 3D depth map may include a shroud of the blade; the processor-based sub-system may be further adapted to also map the seal segment by triangulation onto the 3D space such that the produced 3D depth map also includes the seal segment; the provided 3D reference model may be a model of the blade and the seal segment; and the creep-induced distortion may be determined by measuring relative twisting between the shroud and the seal segment.

Optional features of the system of the third or fourth aspect will now be set out. These are applicable singly or in any combination.

The processor-based sub-system may be further adapted to: calibrate the stereo borescope to determine imaging distortions produced thereby; and use the calibration to adjust the images to remove or reduce imaging distortions before the mapping onto the 3D space.

The system may further include a stereo borescope adapted to be located in the engine adjacent the row of turbine blades for obtaining the stereo images of the turbine blade of the row of turbine blades, the computer readable medium being operatively connectable to the borescope to receive therefrom the images of the turbine blade.

The stereo borescope may be adapted to obtain a stereo video of the turbine blade as the row of turbine blades rotates, the stereo images being stills extracted from the stereo video.

In order to identify same features of the blade in each of the stereo images the processor-based sub-system by further adapted to: perform automated image analysis to extract feature lines of each of the stereo images. For example, the extracted lines can be the trailing edge line, one or more platform edge lines, one or more shroud edge lines from each of the images and/or one or more seal segment edge lines. The image analysis may perform image filtering as a precursor to extracting the edge lines of the blade.

The method of the first or second aspect is typically computer-implemented. Accordingly, further aspects of the disclosure provide: a computer program comprising code which, when the code is executed on a computer, causes the computer to perform the method of the first or second aspect; and a computer readable medium storing a computer program comprising code which, when the code is executed on a computer, causes the computer to perform the method of the first or second aspect.

All of the aspects may map identified features into a 3D space. They may then compare the mapped features to a reference model to determine the amount of creep or distortion of a turbine blade.

BRIEF DESCRIPTION

Embodiments will now be described by way of example only, with reference to the Figures, in which.

DETAILED DESCRIPTION

Figure 1:
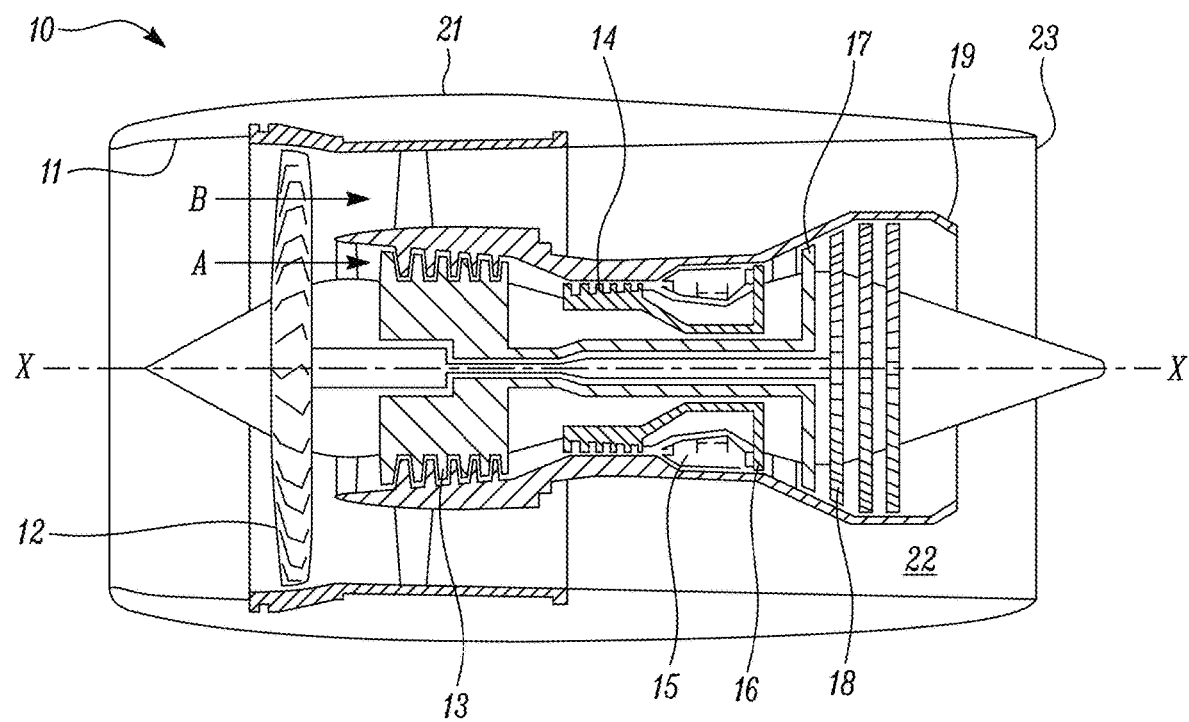
FIG. 1 shows a longitudinal cross-section through a ducted fan gas turbine engine.

With reference to FIG. 1, a ducted fan gas turbine engine for an aircraft is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other aircraft gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The turbine blades of the turbines 16, 17, 18, which are exposed to high centrifugal forces and high temperatures from the working gas expanding through the turbines, are vulnerable to creep deformation. Accordingly, regular inspection of the blades is performed using a stereo borescope.

Preliminary to the inspection, the borescope can be calibrated to determine any imaging distortions which it produces. Various calibration procedures are known to the skilled person, such as described for example by Zhengyou Zhang, *A Flexible New Technique for Camera Calibration*, Technical Report MSR-TR-98-71, https://www.microsoft.com/en-us/research/wp-content/uploads/2016/02/tr98-71.pdf. The calibration can then be used to adjust images obtained by the borescope to remove or reduce imaging distortions.

Figure 2:
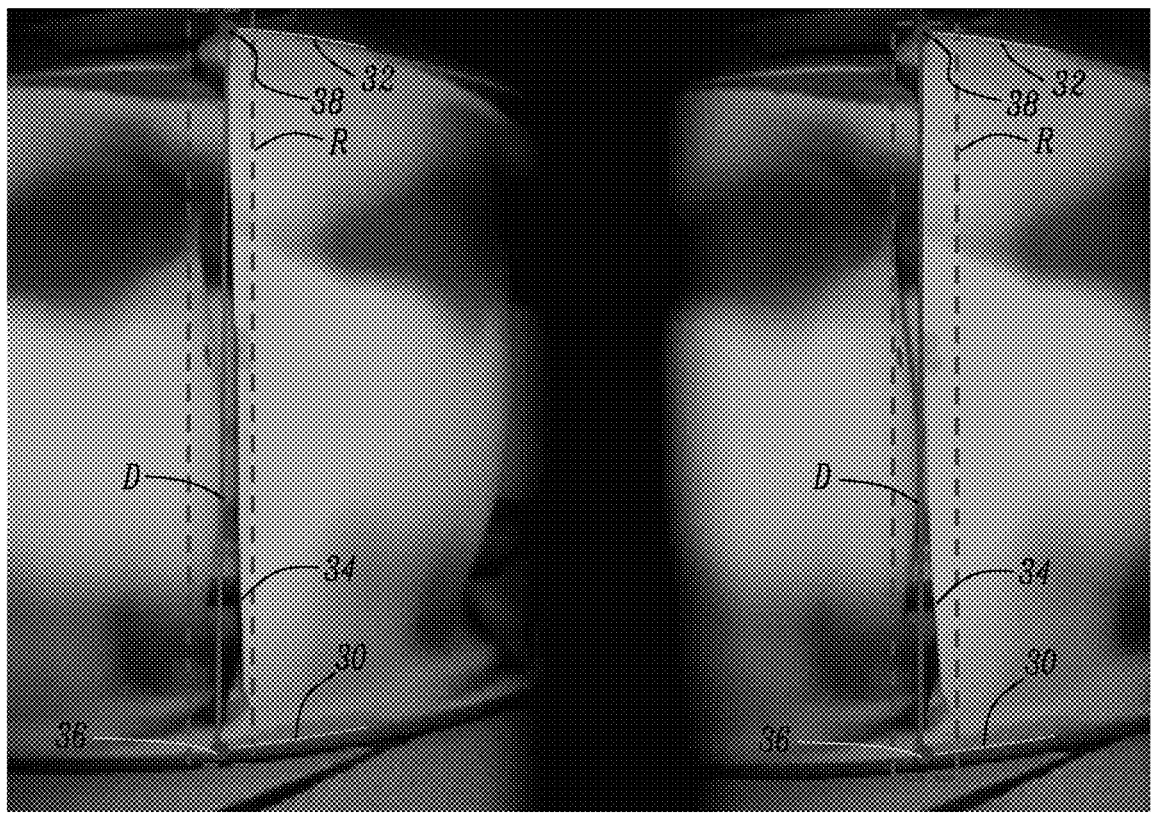
FIG. 2 shows a pair of stereo images of a blade of a row of turbine blades obtained by a stereo borescope.

The stereo borescope is located adjacent a row of blades to obtain stereo images of part of the row. The row is then rotated so that each blade in turn is moved into position relative to the borescope. This can be achieved by indexing the rotational position of the row, or more conveniently by using the borescope to obtain a stereo video of the row as it continuously rotates. Respective stereo stills can then be extracted from the video for each of the blades, each still corresponding to its blade being in a given position relative to the borescope. For example, FIG. 2 shows a pair of left and right stereo stills for a blade.

Having extracted the relevant stills and saved them into suitable memory, a processor-based image analyser performs edge detection on each image. For example, the image analyser may perform image filtering (e.g. noising filtering, texture filtering, compression-less filtering etc.) to enhance the images. For example, on each of the left and right images, edges corresponding to the trailing edge of the blade

34, an edge 30 of the platform of the blade, and an edge 32 of the shroud of the blade may be detected by the image analyser (e.g. using template matching, edge detection, textural analysis etc.) and the lines of these edges extracted.

The image analyser may ensure that the trailing edge 34 is in a defined region of interest (rectangles R in FIG. 2), whereby the image analyser can confirm that the blade is appropriately positioned relative to the stereo borescope. This may further improve the identification of features.

The same features (e.g. trailing edge 34, platform edge 30 and shroud edge 32) are identified in both images of the stereo pair. For example, the same identification algorithm may be applied to each image of the stereopair. Alternatively, features may be identified in one image and epipolar triangulation used to roughly locate a reduced region where an identification algorithm can be applied on the second image. The latter may reduce computation requirements. The image analyser then moves on to a 3D analysis. In particular, it takes the stereo images, and maps the features by triangulation onto a 3D space to produce a 3D depth map of the blade. Suitable triangulation techniques are known to the skilled person. See for example:

https://users.cecs.anu.edu.au/~hartley/Papers/CVPR99-tutorial/tutorial.pdf

Next, landmarks are identified in the 3D space map, such as a radially inner landmark 36 which is the corner of the platform edge 30 closest to the trailing edge 34, and a radially outer landmark 38 which is the corner of the shroud edge 32 closest to the trailing edge 34. The distance D between these two landmarks in the 3D space map is then determined.

The image analyser compares the measured distance D with a reference distance to determine an amount of creep-induced lengthening of the blade. The reference distance is typically the corresponding distance for a turbine blade which has not experienced creep. This can be obtained by measuring an actual blade before service, or by extracting the distance information from a 3D model of the blade. By using two landmarks on the turbine blade, only distortion of the turbine blade is measured, and not for example, relative movement between the turbine blade and an external reference point.

Figure 3:
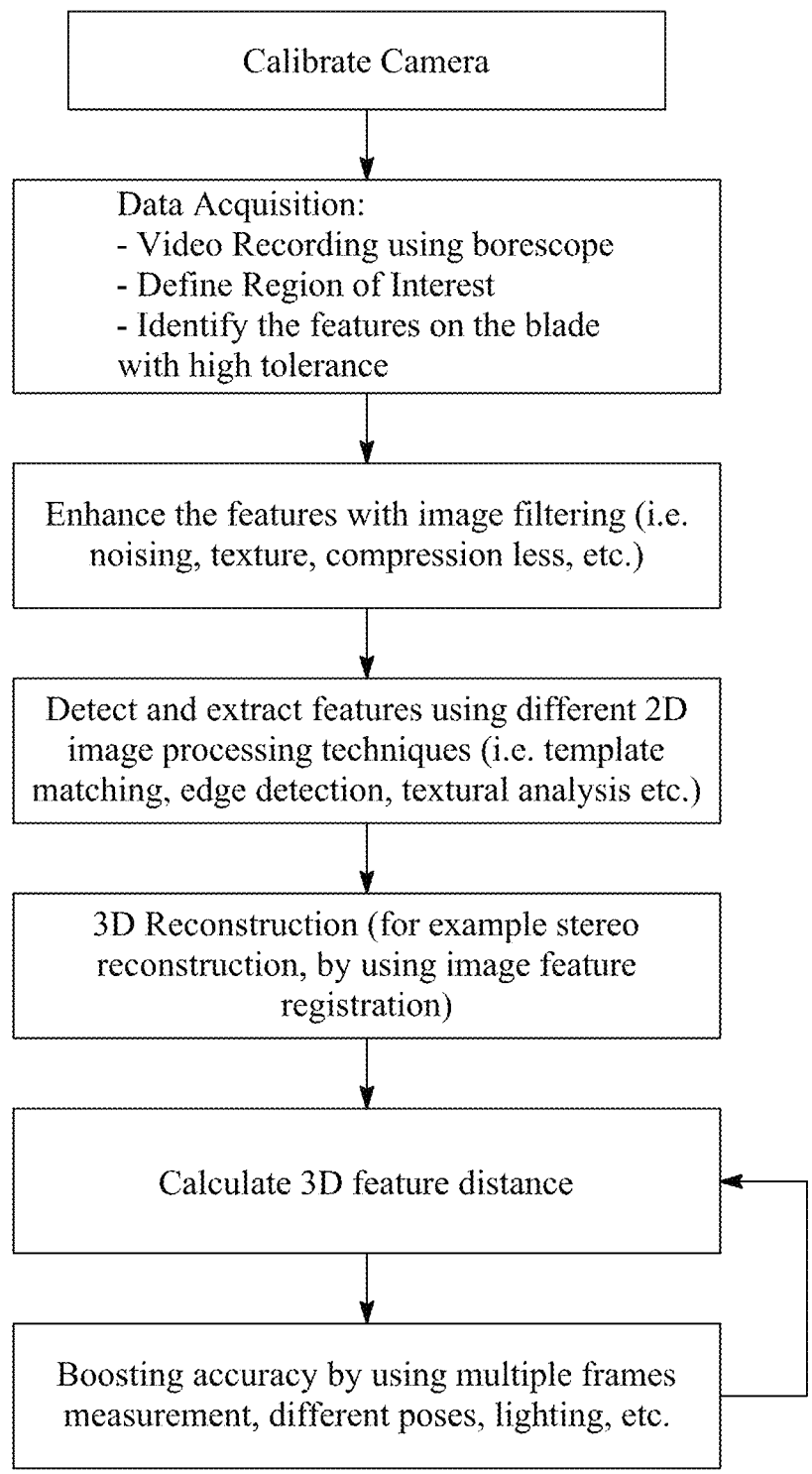
FIG. 3 shows an example process flow for calibration and analysis performed by an image analyser which is operationally connected to a stereo borescope.

FIG. 3 summarises stages of this creep monitoring procedure.

Advantageously, because the measurement of distance can be over the whole radial length of the blade, the accuracy of the measurement is improved. That is, any measurement of change in length due to creep is increased relative to approaches which do not use the whole length.

Using the method, the distance measurement can be obtained with high reproducibility and accuracy. In particular, using features identified in a 2D analysis as the basis for the 3D measurements simplifies and saves computational power. Also, the 2D analysis helps to filter out erroneous features before the 3D measurement, and requiring that the same features are identified in the two stereo images enforces consistency.

The method can also be repeated for further stereo images with the blade changing position slightly (due to rotation) between each image capture to further improve accuracy. An average of the measurements may be determined for comparison with the reference distance.

However, an advantage of building a full or partial 3D depth map of the blade is that more complex shape deviations of the blade can be measured. For example, comparing such a depth map to a 3D reference model (e.g. a CAD model in the form of a 3D point cloud) can allow both elongation and twisting of the blade to be measured. Twisting in particular is difficult to measure using conventional approaches to borescope measurement. Elongation and twisting of a turbine blade both deformations which can limit blade service life.

Figure 4:
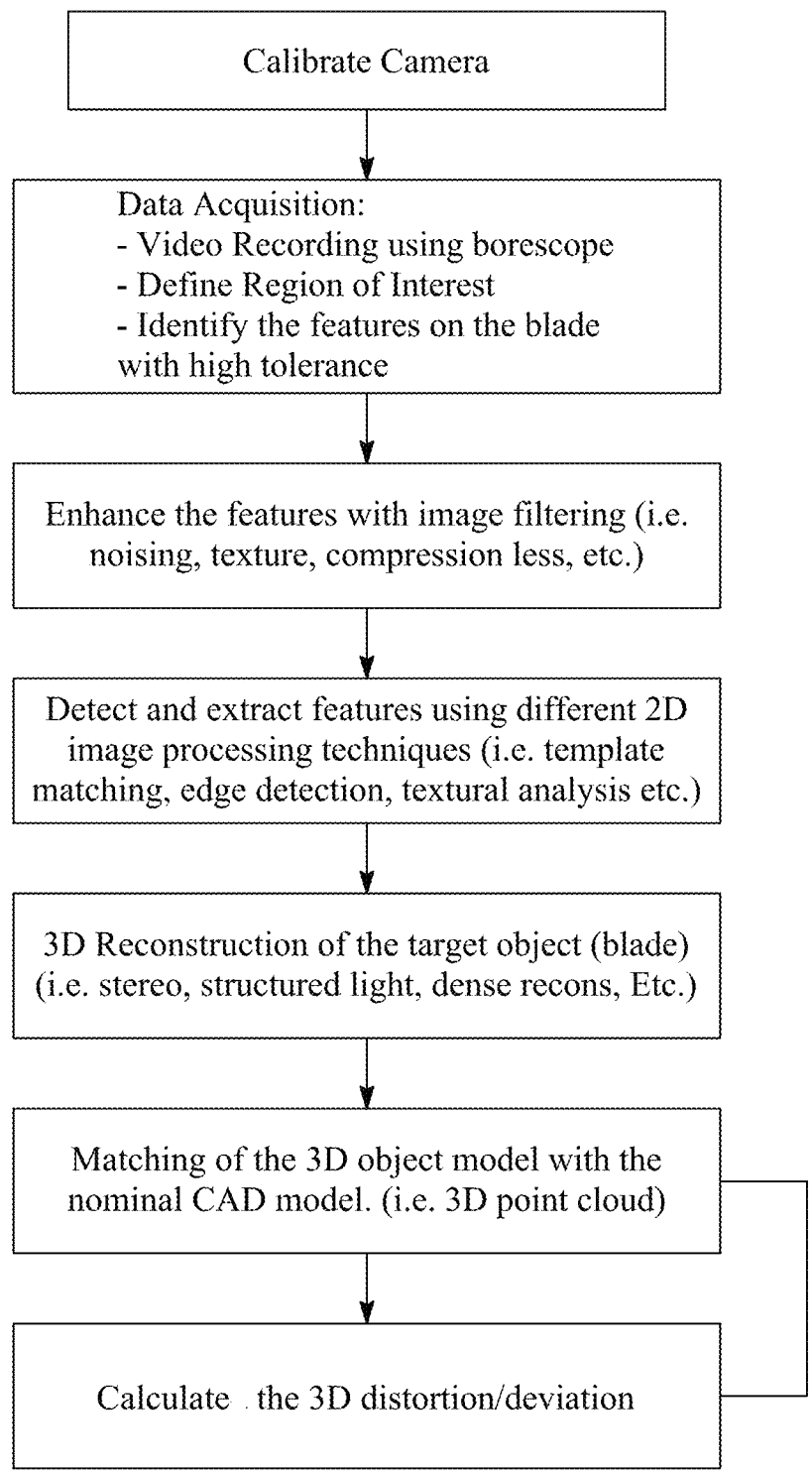
FIG. 4 shows an example process flow for calibration and analysis performed by an image analyser which is operationally connected to a stereo borescope.

One example of a partial 3D depth map is a map of just the platform and shroud of the blade. Deviation of the shroud position (e.g. due to blade elongation and/or twisting) relative to the platform position can then be used to monitor for creep. This approach requires less computation than building up an entire 3D model of the blade for comparison with the reference model. Instead, only parts of the shroud and platform observable by the stereo borescope need to be mapped onto 3D space to produce a depth map. FIG. 4 summarises stages of this more elaborate creep monitoring procedure.

An example of the comparison of a 3D depth map with a 3D reference model may comprise registering both models at the platform, then performing a Procrustes analysis, iterative closest points algorithm, normal closest points transform or similar to return the best fit or average deviation of one model from the other.

Figure 5:
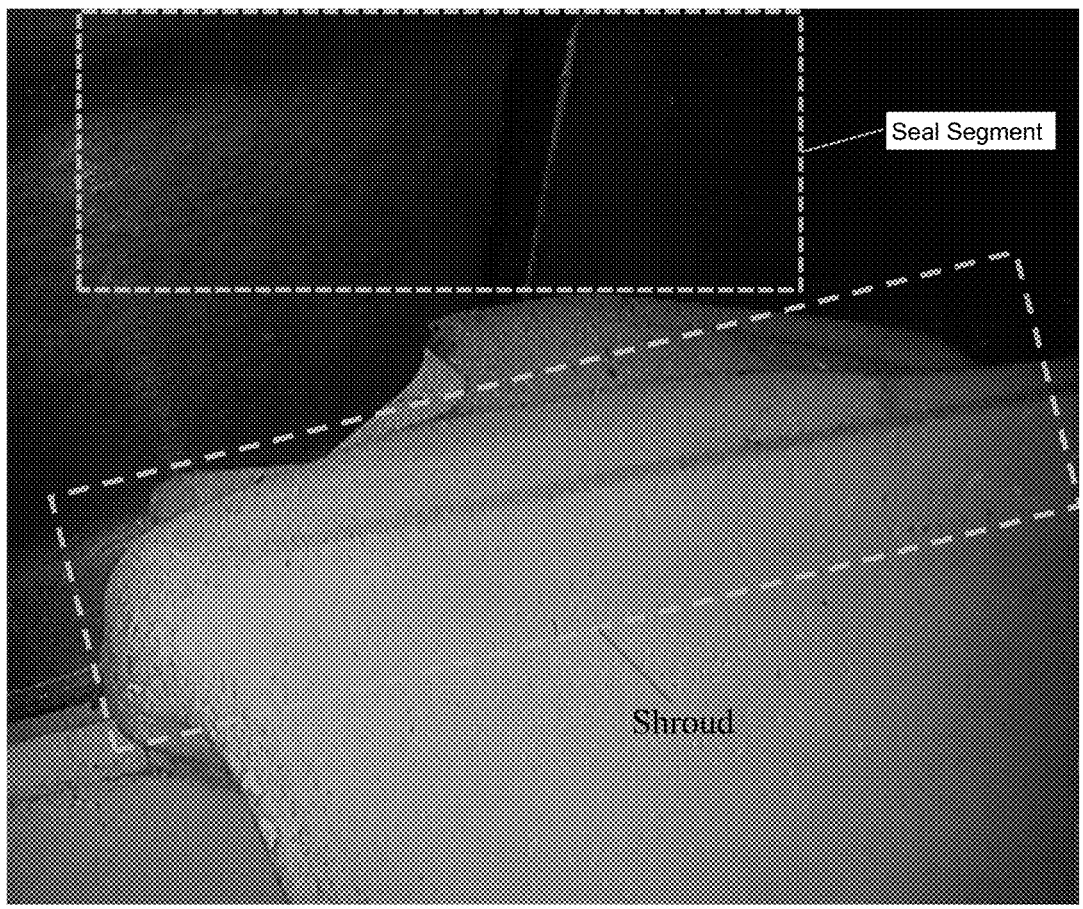
FIG. 5 shows an image of a turbine blade shroud and seal segment with the shroud and seal segment identified.

In a variant of this procedure, the stereo borescope is used to image a seal segment located radially outwardly of the blades. FIG. 5 shows a borescope image of a seal segment adjacent a blade shroud. Similarly, to determining an amount of creep-induced distortion by measuring relative twisting between a shroud and a platform, the amount of distortion can also be determined by measuring relative twisting between a shroud and a seal segment when the blade is at a predetermined rotational position relative to the segment. In this case the stereo images capture the shroud and the seal segment, the image analyser identifies features of the shroud and the seal segment, and maps them onto the 3D space. The 3D reference model also has to include the seal segment. Elongation of a turbine blade can also be determined by measuring the distance between the seal segment and the shroud of the turbine blade. In a further embodiment, elongation and/or rotation of the shroud may be identified by first identifying in 3D space a plane associated with the seal segment and a plane associated with the shroud. The distance between and/or relative angles of these planes may then be compared to the same of a 3D reference model. The seal segment and the shroud are close together, which means a smaller field of view can be used; this may allow the stereo borescope to be positioned closer to the turbine blade for further improved accuracy.

Another example of landmarks on the blade that can be monitored using the above approach are cooling holes on the blade (in particular at the leading edge). Measuring their positions allows a surface strain map of the blade to be produced, i.e. in a manner similar to strain extensometry. For example, the distance between each of the cooling holes may be compared to a 3D reference model and regions on the turbine blade where deformation has occurred may be identified.

In embodiments, any of the preceding comparison methods may be used in combination.

Figure 6:
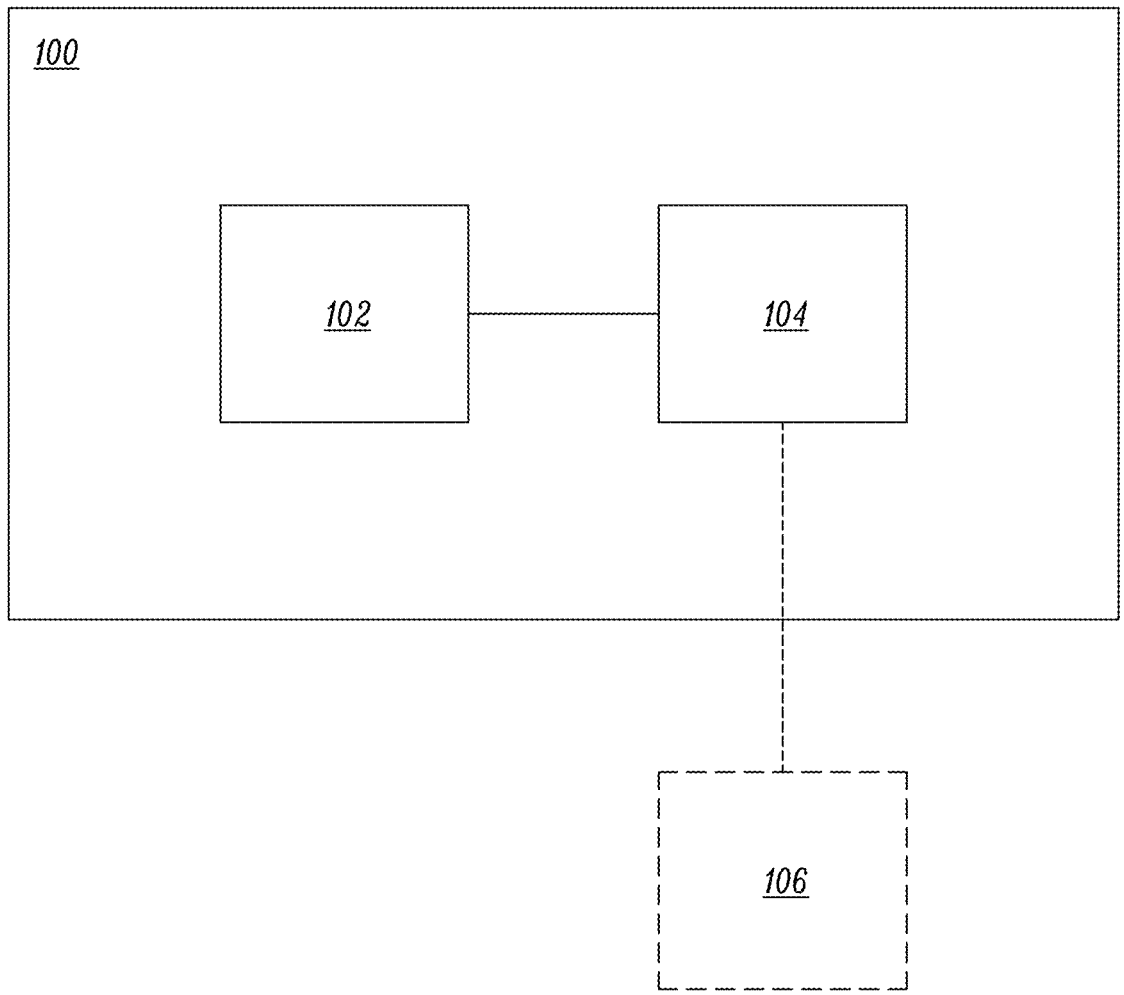
FIG. 6 shows a schematic representation of a system in accordance with an aspect of the invention.

FIG. 6 shows a system 100 according to aspects. The system 100 comprises a computer readable storage medium 104 for storing I.A. stereo images or video received from a stereo borescope 106. The system 100 also comprises a processor-based sub-system 102. The processor-based sub-system 102 is operationally connected to the computer readable storage medium. The operational connection between the processor-based sub-system 102 and the computer readable storage medium 104 may enable the processor-based sub-system to access stereo images stored on the computer readable storage medium 104 and optionally a 3D reference model stored on the computer readable storage medium. The processor-based sub-system 102 may be adapted to perform either of the methods of the first or second aspect. The processor-based sub-system 102 may be adapted to identify same features of the blade in each of the stereo images; map each of the identified features by triangulation onto a 3D space to produce a 3D depth map of at least part of the blade; provide a 3D reference model of the blade; and compare the 3D reference model with the 3D depth map to measure one or more deviations in shape of the blade to determine an amount of creep-induced distortion of the blade.

Alternatively the processor-based sub-system 102 may be adapted to identify same features of the blade in each of the stereo images; map each of the identified features by triangulation onto a 3D space; measure in the 3D space a distance (D) between radially inner and radially outer landmarks (36, 38) on the blade, the positions of the landmarks being determined by reference to the mapped positions of the identified features; and compare the measured distance with a reference distance to determine an amount of creep-induced distortion of the blade.

In embodiments, the system may comprise a stereo borescope 106 shown in FIG. 6 in a dashed line. The computer readable medium may be operatively connected to the stereo borescope to receive the stereo images and/or video of the turbine blade from the stereo borescope 106. In some embodiments control of the stereo borescope 106 may be performed by the processor-based sub-system 102. The stereo borescope 106 may be adapted to be located in the engine adjacent the row of turbine blades for obtaining the stereo images and/or video of the turbine blade of the row of turbine blades. In embodiments, the stereo video of the turbine blade may be captured as a row of turbine blades rotates. The processor-based sub-system 102 may be adapted to extract and analyse still stereo images from the video stored on the computer readable storage medium 104.

Overall, the approaches described above enable automated, reliable, reproducible, quantitative and accurate in-situ creep monitoring that enables effects of creep on different parts of a turbine blade to be understood.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

All references cited herein are incorporated by reference.

We claim:

1. A method of monitoring turbine blade creep in a gas turbine engine, the method including:
   receiving stereo images of a turbine blade of a row of turbine blades, the stereo images being over a whole radial length of the turbine blade, and having been obtained using a stereo borescope located in the engine adjacent the row of turbine blades;
   identifying a trailing edge, a platform edge, and a shroud edge of the blade in each of the stereo images;
   mapping each of the trailing edge, the platform edge and the shroud edge by triangulation onto a 3D space;
   measuring in the 3D space a distance between a radially inner landmark at a corner platform edge closest to the trailing edge, and a radially outer landmark at a corner of the shroud edge closest to the trailing edge on the blade; and
   comparing the measured distance with the distance between the radially inner landmark and the radially outer landmark for a turbine blade that has not experienced creep to determine an amount of creep-induced distortion of the blade.

2. The method according to claim 1, further including:
   calibrating the stereo borescope to determine imaging distortions produced thereby; and
   using the calibration to adjust the images to remove or reduce imaging distortions before the mapping onto the 3D space.

3. The method according to claim 1, further including, preliminary to receiving the image of a turbine blade:
   locating the stereo borescope in the engine adjacent the row of turbine blades; and using the borescope to obtain the image of the turbine blade of the row of turbine blades.

4. The method according to claim 1, wherein the stereo borescope is used to obtain a stereo video of the turbine blade as the row of turbine blades rotates, the stereo images being stills extracted from the stereo video.

5. A method of monitoring turbine blade creep in a gas turbine engine, the method including:
   receiving stereo images of a turbine blade of a row of turbine blades, the stereo images having been obtained using a stereo borescope located in the engine adjacent a row of turbine blades, and the stereo images including a seal segment located radially outwardly of the blades, in use the blades moving past the seal segment as the row of turbine blades rotates;
   identifying same features of the blade in each of the stereo images;
   identifying the seal segment in each of the stereo images;
   mapping each of the identified features by triangulation onto a 3D space to produce a 3D depth map of at least part of the blade, the 3D depth map including a shroud of the blade;
   mapping the seal segment by triangulation onto the 3D space such that the produced 3D depth map also includes the seal segment;
   providing a 3D reference model of the blade and the seal segment; and
   comparing the 3D reference model with the 3D depth map to measure one or more deviations in shape of the blade to determine an amount of creep-induced distortion of the blade, wherein the creep-induced distortion is determined by measuring relative twisting between the shroud and the seal segment.

6. The method according to claim 5, wherein the 3D depth map includes a platform and a shroud of the blade, and the creep-induced distortion includes creep-induced twisting and/or creep-induced elongation of the blade between the platform and the shroud.

7. The method according to claim 5, further including:
   calibrating the stereo borescope to determine imaging distortions produced thereby; and
   using the calibration to adjust the images to remove or reduce imaging distortions before the mapping onto the 3D space.

8. The method according to claim 5, further including, preliminary to receiving the image of a turbine blade:
   locating the stereo borescope in the engine adjacent the row of turbine blades; and
   using the borescope to obtain the image of the turbine blade of the row of turbine blades.

9. The method according to claim 5, wherein the stereo borescope is used to obtain a stereo video of the turbine blade as the row of turbine blades rotates, the stereo images being stills extracted from the stereo video.

10. A system for monitoring turbine blade creep in a gas turbine engine, the system including:
    a computer readable medium for storing stereo images of a turbine blade of a row of turbine blades, the stereo images being over a whole radial length of the turbine blade, and having been obtained using a stereo borescope located in the engine adjacent the row of turbine blades; and
    a processor-based sub-system operationally connected to the computer readable medium and adapted to:
      identify a trailing edge, a platform edge and a shroud edge of the blade in each of the stereo images;
      map each of the trailing edge, the platform edge and the shroud edge by triangulation onto a 3D space;
      measure in the 3D space a distance between a radially inner landmark at a corner of the platform edge closes to the trailing edge on the blade, and a radially outer land mark at a corner of the shroud edge closest to the trailing edge on the blade; and
      compare the measured distance with the distance between the radially inner landmark and the radially outer landmark for a turbine blade that has not experienced creep to determine an amount of creep-induced distortion of the blade.

11. The system according to claim 10, further including a stereo borescope adapted to be located in the engine adjacent the row of turbine blades for obtaining the stereo images of the turbine blade of the row of turbine blades, the computer readable medium being operatively connectable to the stereo borescope to receive therefrom the images of the turbine blade.

12. The system according to claim 10, wherein the stereo borescope is adapted to obtain a stereo video of the turbine blade as the row of turbine blades rotates, the stereo images being stills extracted from the video.

13. A system for monitoring turbine blade creep in a gas turbine engine, the system including:
    a computer readable medium for storing stereo images of a turbine blade of a row of turbine blades, the images having been obtained using a stereo borescope located in the engine adjacent the row of turbine blades, and the stereo images including a seal segment located radially outwardly of the blades, in use the blades moving past the seal segment as the row of turbine blades rotates; and
    a processor-based sub-system operationally connected to the computer readable medium and adapted to:
      identify same features of the blade in each of the stereo images;
      identify the seal segment in each of the stereo images;
      map each of the identified features by triangulation onto a 3D space to produce a 3D depth map of at least part of the blade, the 3D depth map including a shroud of the blade;
      map the seal segment by triangulation onto the 3D space such that the produced 3D depth map also includes the seal segment;
      provide a 3D reference model of the blade and the seal segment; and
      compare the 3D reference model with the 3D depth map to measure one or more deviations in shape of the blade to determine an amount of creep-induced distortion of the blade, wherein the creep-induced distortion is determined by measuring relative twisting between the shroud and the seal segment.

14. The system according to claim 13, further including a stereo borescope adapted to be located in the engine adjacent the row of turbine blades for obtaining the stereo images of the turbine blade of the row of turbine blades, the computer readable medium being operatively connectable to the stereo borescope to receive therefrom the images of the turbine blade.

15. The system according to claim 13, wherein the stereo borescope is adapted to obtain a stereo video of the turbine blade as the row of turbine blades rotates, the stereo images being stills extracted from the video.

* * * * *